W. E. Barton,
Sleigh Bell.

No. 105,412.      Patented July 19, 1870.

United States Patent Office.

WILLIAM E. BARTON, OF EAST HAMPTON, CONNECTICUT.

Letters Patent No. 105,412, dated July 19, 1870.

IMPROVED MODE OF ATTACHING SLEIGH-BELLS.

The Schedule referred to in these Letters Patent and making part of the same

I, WILLIAM E. BARTON, of East Hampton, in the county of Middlesex and State of Connecticut, have invented certain Improvements in Attaching Sleigh-Bells, of which the following is a specification.

Nature and Objects of the Invention.

My invention consists, first, in a coupling for attaching a bell securely to its strap without clamping it tightly thereon. The said coupling is made with a perforation in line with its axis, for the reception of a screw, rivet, or its equivalent, for attaching it to the strap, a neck to pass through an aperture in the bell and afford a bearing on the strap, and a flange or projection, upon which the bell is supported.

My invention consists, second, in attaching a bell to its strap by means of a screw or rivet passing through the strap and into a flanged coupling, which supports the bell, substantially as hereinafter set forth.

Description of the Accompanying Drawing.

Figure 1:
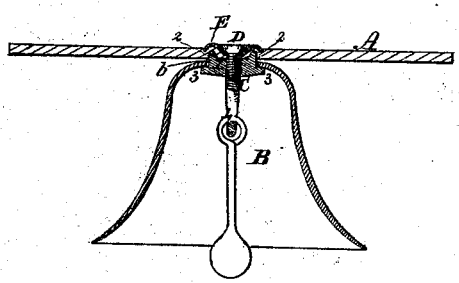
Figure 1 is a longitudinal sectional view of the bell and its attachments.
Figure 2:
Figure 2 is a perspective view of my improved coupling for attaching the bell to the strap and the tongue to the bell.

General Description.

A represents a part of the strap, and

B, the bell, in the top of which is an aperture, $b$, of circular or other form.

C is my improved coupling-nut, the neck 1 of which is formed to pass through the aperture $b$, and may have at its end one or more spurs or ribs, 2 2, which, when partly imbedded in the strap, will prevent the nut from turning thereon.

A flange or projection, 3, extending beyond the radius of the aperture $b$, affords support to the bell, and an eye or hook, 4, permits the attachment of the tongue in any common way.

The coupling C may be firmly secured to the strap A by means of a screw, D, passed through the strap and into the coupling-piece C, the latter being threaded for its reception.

This screw may be nicked as a common wood-screw, so that it can be applied by means of a screw-driver, and its head may be received in the concave face of a washer, E, which is preferably interposed between it and the strap to afford a more secure and durable attachment.

I have described the use of a screw to attach the flanged coupling-piece to the strap, because this is my preferred device for this purpose; but a rivet may be substituted for the screw without departing from the essential principles of my invention.

In either case the firm union between the strap A and coupling C causes the latter to form a very secure attachment for the bell, without tightly clamping in such a manner as to impair or interfere with its vibrations, as do most devices in use for attaching bells to straps.

Claims.

I claim as my invention—

1. The coupling C, constructed with an eye or hook to receive the tongue, a neck, 1, to pass through an aperture in the bell, and a flange or projection, 3, to support the bell, substantially as set forth.

2. The flanged coupling C, in combination with a screw or rivet, D, for connecting the bell to the strap, in the manner described.

W. E. BARTON.

Witnesses:
OCTAVIUS KNIGHT,
WM. H. BRERETON, Jr.